April 8, 1947.                J. F. LINDNER                2,418,805
                    APPLE PARING AND CORING MACHINE
                Filed Dec. 16, 1944        4 Sheets-Sheet 1
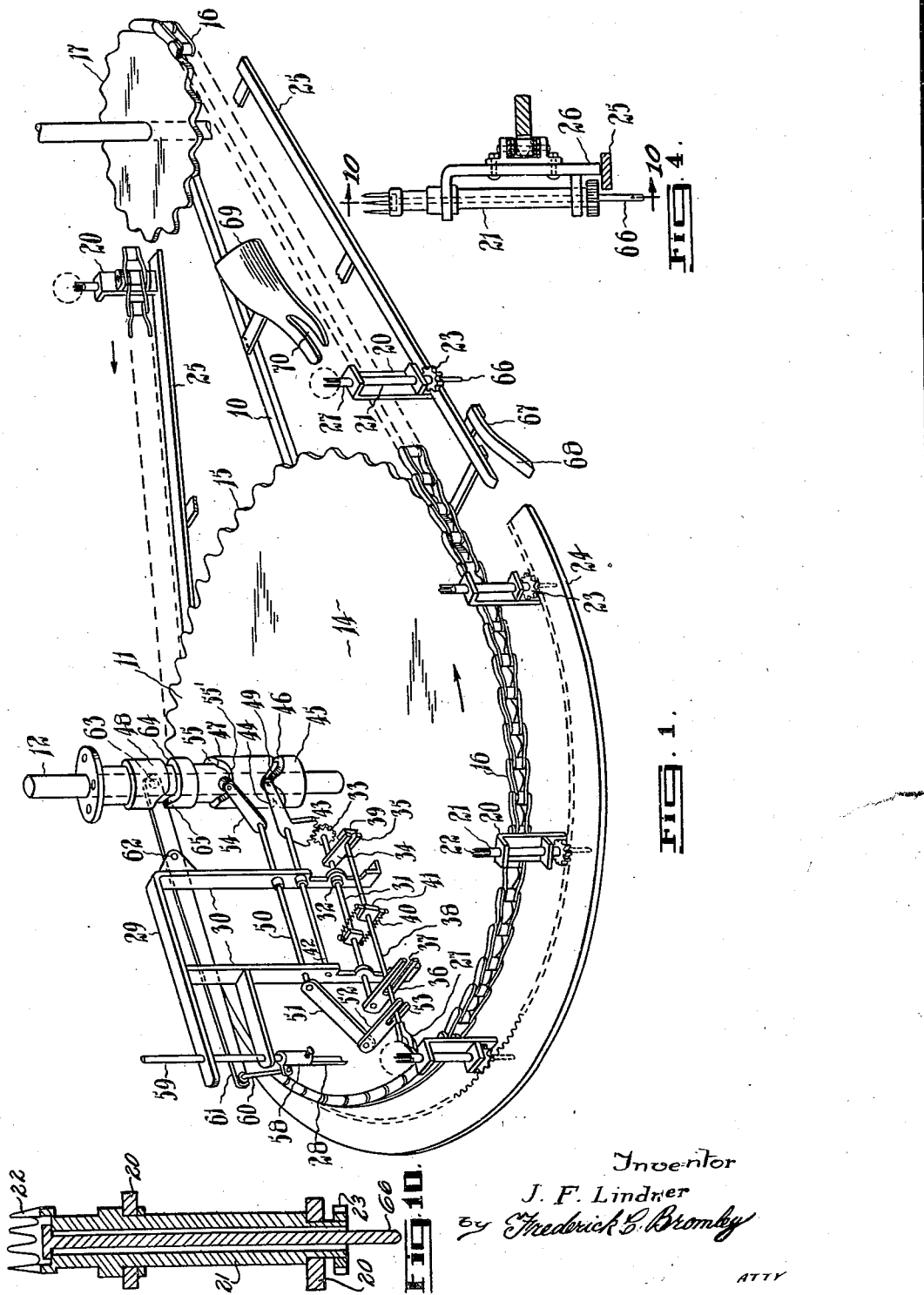
Inventor
J. F. Lindner
by Frederick C. Bromley
ATTY

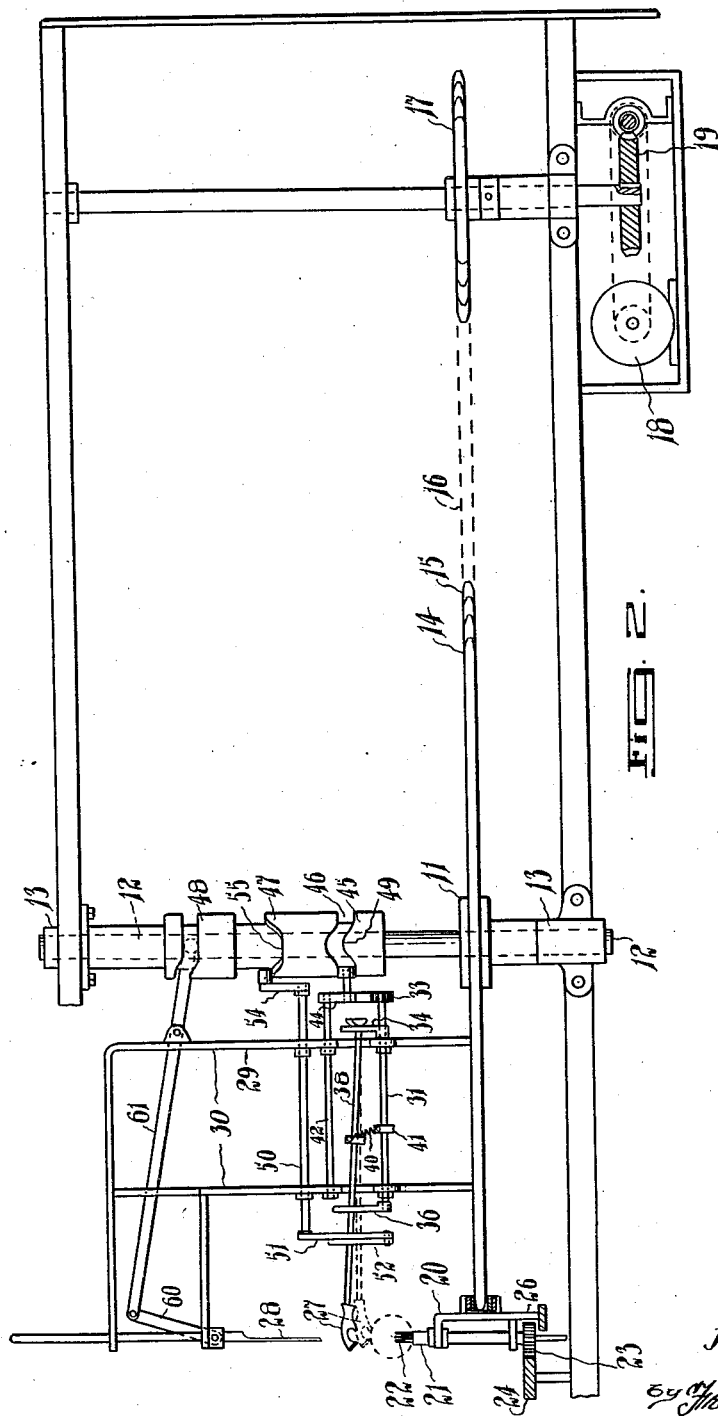

April 8, 1947.　　　J. F. LINDNER　　　2,418,805
APPLE PARING AND CORING MACHINE
Filed Dec. 16, 1944　　　4 Sheets-Sheet 3
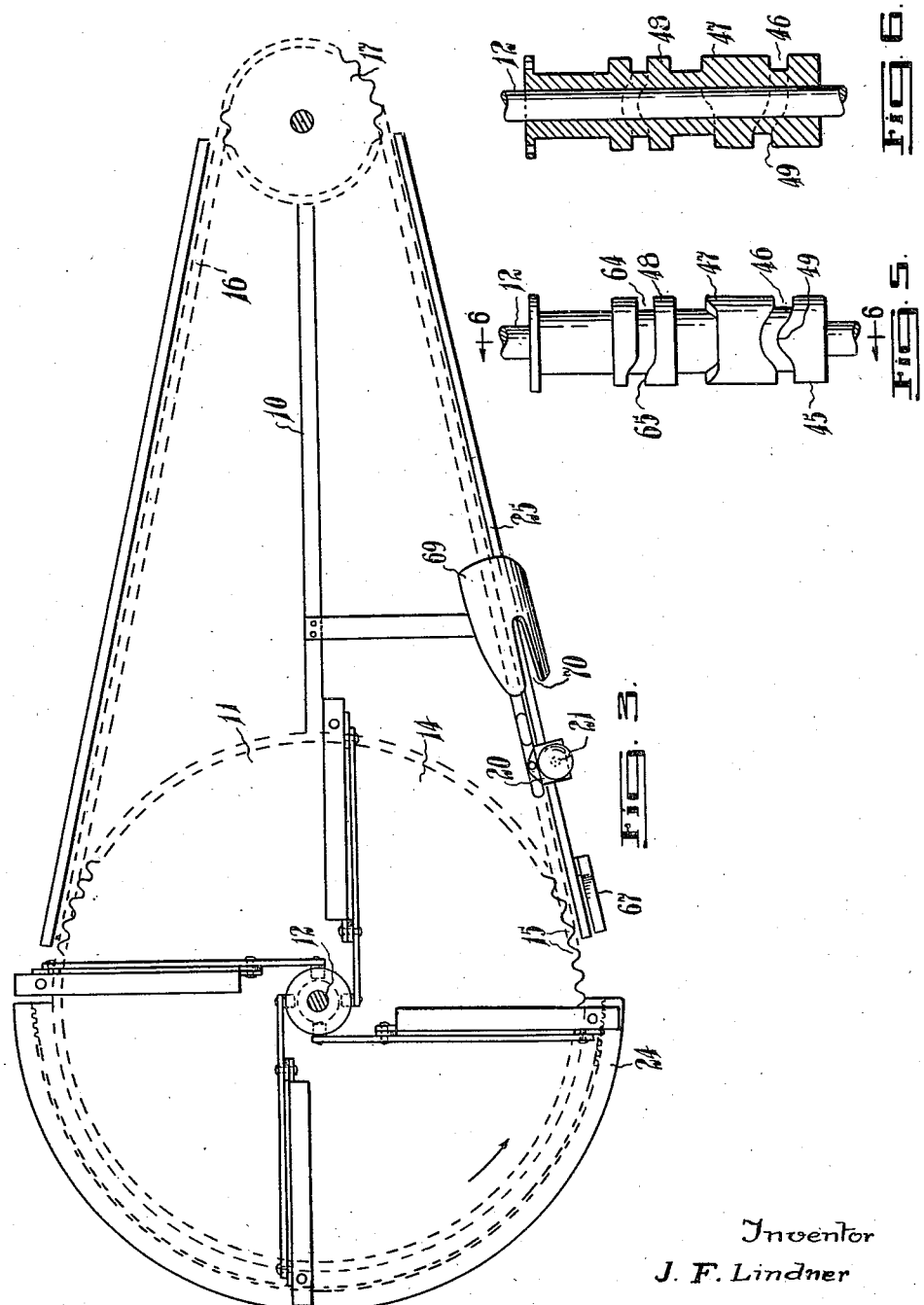
Inventor
J. F. Lindner
By Frederick C. Bromley
ATTY.

April 8, 1947. J. F. LINDNER 2,418,805
APPLE PARING AND CORING MACHINE
Filed Dec. 16, 1944 4 Sheets-Sheet 4
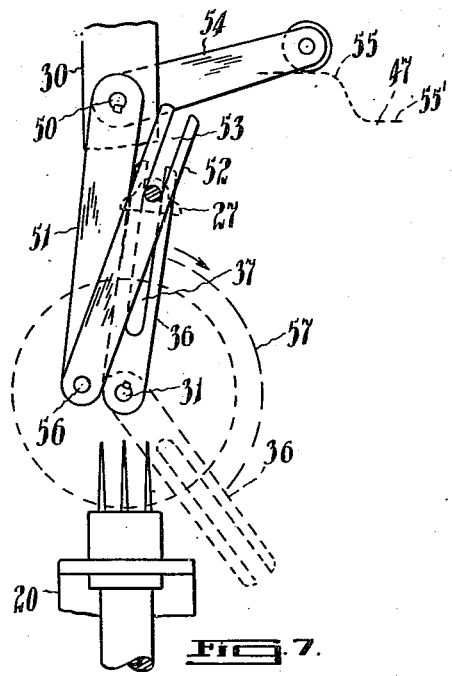
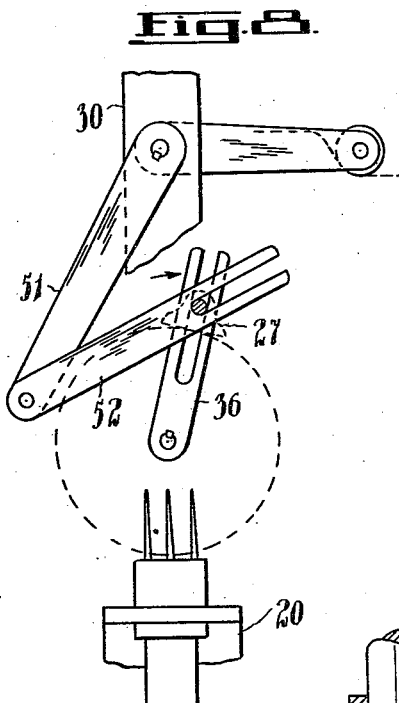
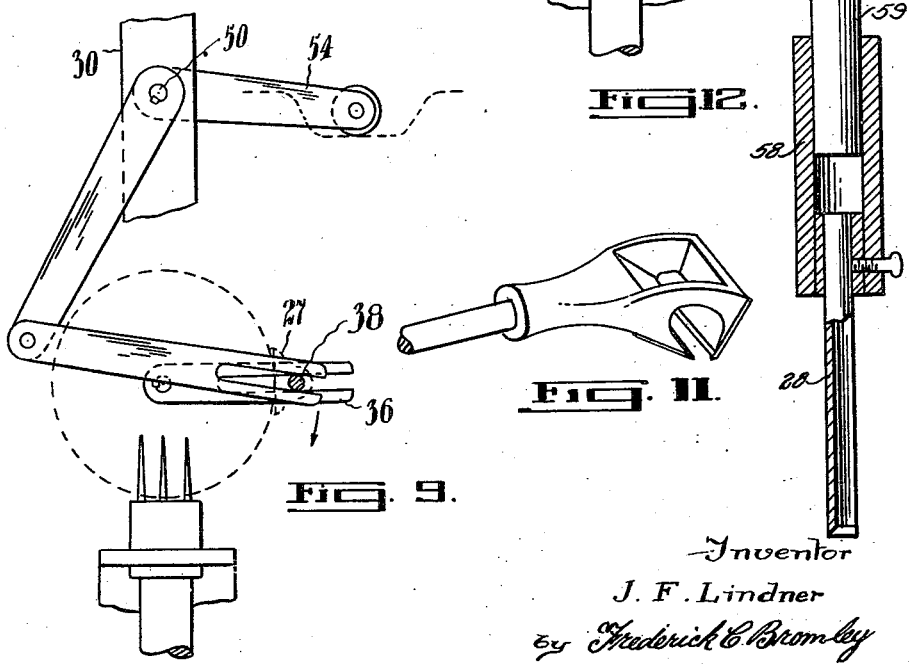
Inventor
J. F. Lindner
By Frederick C. Bromley
ATTY.

Patented Apr. 8, 1947

2,418,805

UNITED STATES PATENT OFFICE 2,418,805

APPLE PARING AND CORING MACHINE

John F. Lindner, Norval, Ontario, Canada

Application December 16, 1944, Serial No. 568,409

17 Claims. (Cl. 146—38)

The invention relates to improvements in apparatus for automatically paring and coring apples as described in the present specification and shown in the accompanying drawings forming a part thereof.

The invention has for its general object the provision of a highly efficient and serviceable mechanism adapted to peel and core apples in a continuous process.

The invention has as a further object the provision of a rotary head continuously driven and incorporating a multiplicity of peeling and coring units radially extending from the axis of rotation and spaced therearound. A distinctive feature of said units is that they are successively brought into operation by a central cam mechanism as they are carried around by the rotary head.

Another object is to produce an improved peeling device adapted to lower a knife into paring engagement with the upper end of an apple impaled on a rotary holder and to cause the knife to traverse the revolving apple to remove the skin uniformly without wasting the apple irrespective of its size or shape.

A still further object is to furnish the rotary head with a peeling and coring unit in which a coring spoon is brought into operation at the finish of the peeling operation and while the rotary head is in motion.

A still further object is to provide a rotary head connected to an endless belt in the form of a chain having holders at intervals along its length for registering with the peeling and coring units and having forks upon which apples are impaled by an attendant.

Still another object is to provide for an automatic ejection of cores by passage of a plunger over a cam in the travel of the chain, and also to provide for the removal of the prepared apples by passage of the forks through fingers or other stationary agents adapted to lift the apples off the forks in the unloading operation.

Having described major objects and advantages of the invention, other objects and advantages will manifest themselves to those skilled in the art from the ensuing specification of which the annexed drawings illustrate one practical form of the invention.

In the drawing,

Fig. 1 is a perspective view of the invention showing one of the peeling and coring units which are carried in the rotary head, the rest of these units as well as certain other details of the machine being omitted for the sake of clarity.

Fig. 2 is a side view of the machine also restricted to the showing of but one of the several peeling and coring units.

Fig. 3 is a schematic plan view of the machine denoting four of said units.

Fig. 4 is a detail of a holder for an apple.

Fig. 5 is an elevation of the central cams on the rotary head for actuating said units.

Fig. 6 is a vertical section taken on line 6—6 thereof.

Figs. 7, 8 and 9 are outer end views of the mechanism for actuating the peeling knife. These views diagrammatically illustrate the action of the mechanism and the manner in which it controls the knife.

Fig. 7 denotes the position of the mechanism in which the knife is elevated for descent upon an apple as the apples come into alignment with the respective peeling and coring units during movement of the rotary head.

Fig. 8 shows the position of the mechanism in which the knife contacts the top of the apple, and Fig. 9 shows the position of the mechanism in which the peeling operation is well advanced.

Fig. 10 is an enlarged vertical section of one of the forks taken on line 10—10 of Fig. 4, showing the plunger therein.

Fig. 11 is a perspective view of a knife.

Fig. 12 is a detail aspect of a corer partly in section.

Like numerals of reference indicate corresponding parts in each of the figures throughout the drawings of the invention.

In performing the invention there is provided a suitable frame 10 for support of the various components and which may be of the skeleton type. A rotary head 11 is journalled in the frame by means of a spindle 12 mounted in bearings as at 13.

The rotary head comprises a circular table 14 having peripheral teeth 15 engaged with an endless chain 16.

In practice a large sprocket is used as the table and is driven by the chain which is actuated by a small sprocket 17 driven as by an electric motor 18 through the intermediary of a speed-reducing gearing 19. Holders 20 are affixed to links of the chain at intervals throughout its length. Each holder carries a vertically arranged fork 21 suitably journalled for rotation and having customary prongs 22 at its upper end for the impaling of an apple. The stem of the fork is fitted with a pinion 23 of the spur gear type.

At the front of the rotary head there is provided a stationary rack 24 of semi-circular configuration having internal teeth for meshing with the pinions of the forks. The machine is operated at a comparatively low speed so that an attendant can load the holders 20 by impaling apples on the forks thereof whilst they travel along with one run of the chain toward the rotary head.

Although it is preferable that the holders be loaded manually, mechanical means might be resorted to for this purpose, and it is to be understood that the mode of loading the holders does not form a part of the invention.

It is desirable to support the holders at the runs of the chain as by slides 25 disposed so that their top faces may be traversed longitudinally by suitable elements 26 depending from the holders to supply bearing surfaces. Said slides terminate at the ends of the rack 24 and are disposed on a lower plane than the same. The rotary head is continuously driven by the chain connection and apples placed on the holders travel toward a side of the same and are caused to rotate about the axes of the forks by the engagement of the pinions 23 with the rack 24.

The paring and coring units are mounted on the table 14 to turn with the same and are radially arranged for operation by means of a central cam mechanism. In the actual machine eight such units are employed but the number may be varied as circumstances dictate. The units include a paring knife 27 and a coring spoon 28 thereover. The angular spacing of the units on the table corresponds to the spacing of the holders on the chains and said units are arranged to come into alignment with the holders as they arrive at the table.

Accordingly, each unit moves in a circular path with a coinciding holder.

The units are of identical construction, hence a description of one will suffice. An upright bracket 29 is affixed to the table and includes the standards 30. A shaft 31 is horizontally journalled in the standards and shouldered against endwise movement by collars 32. The shaft is disposed at an angle to a radial line so that its inner end will lie to one side of the spindle 12. Said inner end is equipped with a spur gear 33 keyed thereon. The inner end is provided with a bifurcated arm 34 rigid therewith, the bifurcation of which is formed by a slot 35 extending inwardly from its outer end.

The outer end of said shaft is supplied with a similar bifurcated arm 36 rigid thereon and parallel to aforesaid arm. Arm 36 is of a greater length than the arm 34 but its bifurcation is also formed by a slot, denoted at 37, extending inwardly from its outer end. However its slot is of an increased depth such that the distance from the inner end to the shaft is the same as that of the slot 35.

The arms 34 and 36 jointly support a knife rod 38 which is loosely contained in the slots 35 and 37. The knife 27 is fixed to the outer end of rod 38 for acting on an apple carried by a holder which coincides with the unit. The knife is of the usual type in which a cutting edge is arranged transversely of the rod and in which a heel or guard is provided to control the depth of penetration of the cutting edge. The inner end of the rod has a rocker 39 affixed to it and seated against the outer face of the inner arm 34 to constrain the rod against shifting forwardly, but leaving it free to turn and to swing angularly using the inner end of slot 35 as a fulcrum and using the slot 37 as a guideway whereby the knife may be moved to and away from the holder with which it is associated during a particular turn of the table.

Said rod is resiliently urged inwardly of the arms 34 and 36 by means of a pair of tension springs 40 laterally connected to the rod and to the shaft 31 as by blocks 41. The pull of one spring is counterbalanced by the pull of the other spring so that the springs thereby co-act to cause the knife to bear upon an apple with sufficient pressure to enable it to peel and at the same time to turn to any required angular extent about the axis of the rod as may be required to conform to incidental irregularities of surface contour of the apple travelling around a side thereof, as will be more clearly understood as the description proceeds.

Above the shaft 31 is a shaft 42 parallel therewith and also journalled in the standards 30 and provided with a segmental gear 43 keyed or otherwise secured to the inner end thereof and in mesh with the pinion 33. The segmental gear has an arm 44 at one side thereof which forms therewith a bell-crank member. The arm 44 constitutes a follower for a cam 45 and has a roller for operating in the groove 46 of the same. The cam forms a part of the cam mechanism for actuating the peeling and coring unit and is the lower of three cams disposed one above another, the medial cam being denoted at 47 and the upper cam being indicated at 48. The cams are all stationary members of the cylindrical type and encircle the axis of the spindle 12.

The groove 46 of cam 45 is of a circular formation with the exception of a throw surface 49 which is adapted to impart a rise and fall to the follower or arm 44 for turning the gear 33 through a substantially straight angle and returning it during a relatively small angular movement of the table 14. The throw of the cam 45 serves to first swing the arms 34 and 36 downwardly and then upwardly to their original positions. The arms 34 and 36 carry the rod 38 with them and thus cause the knife to traverse an apple and to return it to an overhead position. During such movement the rod 38 is lightly held against turning about its own axis by means of the springs 40 in the result that the knife may turn about the rod-axis along with said rod should it be caused to do so by any irregularity of contour of the apple.

Over the shaft 42 is a shaft 50 also journalled in the standards aforesaid and carrying at its outer end a toggle-joint composed of the pivotally connected arms 51 and 52, the arm 51 being rigid with the shaft and the arm 52 being provided with a slot 53 extending inwardly from its distal end and engaging the rod 38. Shaft 50 has an arm 54 rigidly applied to it to serve as a follower for co-acting with the cam 47, and the follower has a roller terminus which rests on the guide surface 55 of the cam. This guide surface is circular and notched as at 55'.

The function of said toggle-joint is to cause the knife to approach the apple and to recede therefrom during operation of the rod 38. This regulatory action will be best understood from an inspection of Figs. 7, 8 and 9. The normal position of the arms 34 and 36 is substantially perpendicular—see Fig. 7—and in this position the arms 51 and 52 of the toggle-joint are in vertical folded or crooked position with their pivotal point substantially coinciding with the axis of the shaft 31. The distance between the inner end of the slot 53 and said pivotal point, denoted at 56, is greater than the distance between the inner end of slot 37 and the axis of the shaft 31. Consequently the outer end of the rod 38 is engaged by the inner end of slot 53 and thereby retained in elevated position so that the knife will be directly over and clear of an apple brought into position with the unit. As the table turns, the follower 54 drops into the notch 55' causing the arm 51 to swing backwardly and thus lowering the knife on the apple—see Fig. 8. While the follower 54 is riding in the notch the surface 49 of the cam 45 comes into operation and swings the arms 34 and 36 downwardly to enable the knife to remove the skin in a continuous strip. While this is taking place the arm 52 is moving downwardly with the rod 38—see Fig. 9. In the ultimate downward travel of the knife it closely approximates the fork to assure of complete removal of the skin. At this stage the return movement of the knife begins and at the same time the follower 54 starts to ascend the notch of the cam 47 and in doing so throws the arm 51 forwardly thus causing the arm 52 to push the rod 38 outwardly so that the knife will return to its elevated position with a sweep wide of the apple to clear the same as indicated by the dash line 57—Fig. 7.

An advantageous feature of the mechanism is that the knife descends into cutting engagement with the top of the apple and thus turns around a side thereof and by its action completely peels the apple in a thoroughly efficient manner, leaving it prepared for coring whilst it is rotating on the travelling holder.

The coring spoon 28 comes into action at the finish of the peeling operation. The spoon is of an ordinary semi-circular shape in cross section with a lateral cutting edge. It cuts around the fork and is a non-rotatable member suitably held in a stock 58 carried by a bar 59 vertically slidable in supporting elements of the bracket 29. The stock is connected by a link 60 to the outer end of a walking bar 61 pivoted at 62 intermediate of its length to said bracket, the inner end being supplied with a roller 63 engaged in the groove 64 of the cam 48. The groove 64 has a throw surface 65 by which the walking bar is swung downwardly at its outer end and returned in timed relation to the peeling operation. The mechanism lowers the spoon into coring engagement with the apple and returns it while the fork is still revolving by reason of the engagement of the gear 23 with the rack 24.

It will be manifest that by this construction the central cams are common to all of the peeling and coring units and function to induce them to operate one at a time during each complete turn of the table so that several apples are prepared during each turn of the rotary head.

The forks 21 are hollow members provided with a plunger 66 as customary for ejection of the core. At the unloading side of the chain there is provided a suitable stationary cam as at 67 disposed in the path of travel of the lower ends of said plungers and provided with an inclined surface 68 such as to force the plungers upwardly as they ride thereover. Accordingly the cam 67 provides for removal of cores subsequent to peeling and core-cutting operations.

Also, at the unloading side of the chain is a device as at 69 adapted to successively pick the apples off the forks for discharge into a receptacle which is not shown since it may be of ordinary construction. The device preferably comprises a spatula plate having a bifurcated end formed by a slot 70 for allowing the forks to pass therethrough. The bifurcated end is disposed toward the rotary head and at an elevation to permit the holders to pass thereunder. The spatula plate slopes upwardly from its slotted end and its rear portion is transversely inclined. The slotted end passes under an apple and raises it off the fork so that it will gravitate into the receptacle.

From the preceding description it will be evident that there is provided a highly efficient and serviceable apparatus for automatically peeling and coring apples and for discharging the prepared apples into a receptacle.

Such changes and modifications of the invention may be resorted to as come within the spirit and scope of the subjoined claims.

I claim:

1. In an apparatus of the kind described having a holder adapted to have an apple impaled thereon and rotated, means for peeling the apple while it is rotating, said means including a knife, a rod rigidly extending therefrom, an actuating device for the rod adapted to swing the rod in an arc to cause the knife to travel along a side of the apple from its top to peel the same and to swing the rod back to its initial position at the end of the peeling operation, said actuating device including a guideway in which the rod is supported for movement radially of the centre of said arc, resilient means urging the rod inwardly of the guideway to cause the knife to bear on the apple, and means for causing the rod to move outwardly of the guideway as it is swung back to its initial position so that the knife will clear the apple during such return swing of the rod, said last mentioned means comprising a swingable arm arranged transversely of the rod and having a slotted distal end engaged therewith, a member pivotally carrying the arm to enable it to swing, and means for shifting this member to positionally advance the swingable arm at the end of the peeling operation whereby it is operative to cause the rod to describe an arc wide of the apple as it swings back to initial position.

2. In an apparatus of the kind described having a holder adapted to have an apple impaled thereon and rotated, means for peeling the apple while it is rotating, said means including a knife, a rod rigidly extending therefrom, an actuating device supporting the rod and adapted to turn it about an axis transversely of said holder in an oscillatory manner to cause the knife to travel about the apple, resilient means urging the rod inwardly of said axis to bring the knife into cutting engagement with the apple, and a swingably supported arm arranged transversely of the rod and having a slotted distal end engaged with the same, the arrangement being such that the rod in one movement of its oscillation is urged outwardly of said axis by the arm so as to throw the knife out of engagement with the apple.

3. In an apparatus of the kind described having a holder adapted to have an apple impaled thereon and rotated, means for peeling the apple while it is rotating, said means including a knife, a rod rigidly extending therefrom, an actuating device supporting the rod and adapted to turn it about an axis transversely of said holder in an oscillatory manner to cause the knife to travel about the apple, resilient means urging the rod inwardly of said axis to bring the knife into cutting engagement with the apple, and a cam-actuated mechanism adapted to urge the rod outwardly of said axis in one movement of its oscillation for disengaging the knife, the cam-actuated mechanism comprising a journalled shaft arranged parallel to said axis for operation by a cam follower, and a pair of pivotally united arms disposed transversely of the rod, one of the arms being rigid with the shaft and the other having a slotted connection with the rod.

4. In an apparatus of the kind described having a holder adapted to have an apple impaled thereon and rotated, means for peeling the apple while it is rotating, said means including a knife, a rod rigidly extending therefrom, an actuating device supporting the rod and adapted to turn it about an axis transversely of said holder in an oscillatory manner to cause the knife to travel about the apple, resilient means urging the rod inwardly of said axis to bring the knife into cutting engagement with the apple, and a toggle-joint mechanism adapted to urge the rod outwardly of said axis in one movement of its oscillation so as to throw the knife out of engagement.

5. A device as set forth in claim 4, in which the toggle-joint mechanism comprises a journalled shaft, a first arm rigidly mounted thereon, a second arm pivoted to the first arm and provided with a slot at its distal end by which it is engaged with the rod, a cam follower connected to the shaft, and a cam engaged by the follower for imparting a to and fro motion to the shaft.

6. In an apparatus of the kind described having a holder adapted to have an apple impaled thereon and rotated, means for peeling the apple while it is rotated, said means comprising the combination of a knife, a device for lowering and swinging the knife about the apple in a peeling operation and then restoring the knife in a return movement, and a device adapted to come into operation at the completion of the peeling operation for causing the knife to recede from the apple so that it will swing clear of the same in said return movement, said last mentioned device comprising a toggle-joint formed of a pair of arms, one of the arms having a bifurcated connection with the knife and the other having a pivotal supporting connection about which it is turned.

7. In an apparatus of the kind described, a continuously driven rotary head, holders spaced peripherally therearound adapted to have apples individually impaled thereon and including revolving impaling elements, peeling units carried by the rotary head corresponding to the holders, each peeling unit comprising an elevated knife, a device for lowering and swinging the knife about the apple in a peeling operation and then restoring the knife in a return movement, and a device adapted to come into operation at the completion of the peeling operation for causing the knife to recede from the apple so that it will swing clear of the same in said return movement, each of said devices including a fixed cylindrical cam centrally of the rotary head having an endless cam surface with a single throw, a follower engaged with the cam surface for operation by the throw thereof as it is carried around by the rotary head, and a shaft mounted radially of the rotary head and turned by the follower.

8. A machine of the class described, comprising an endless carrier chain, spaced holders on the chain adapted to have apples individually impaled thereon, means for driving the chain, a rotary head having peripheral teeth engaged with the chain, means for rotating the apples while the holders are travelling around the rotary head, and a series of peeling and coring units spaced around the rotary head adapted to come into alignment with the holders, each unit including means for operating a peeling knife and a coring spoon and characterized in that such means comprises a central cam mechanism having endless cam surfaces common to all of the units.

9. A machine as set forth in claim 8, in which the means for operating the peeling knife comprises a device adapted to lower and swing the knife about the apple to effect the peeling thereof and then to swing the knife upwardly in a return movement, and a device adapted to come into operation when the apple is peeled to cause the knife to recede clear of the apple as it swings upwardly in said return movement.

10. A machine for peeling and coring apples or similar articles, including an endless carrier belt having runs in a substantially horizontal plane, holders on said belt having forks to receive the individual articles at one run of the belt, means adjacent to the path of travel of the belt for performing peeling and core cutting operations on the articles, and cam means for ejecting cores from the articles after said operations have been performed, said cam means consisting of plungers in the forks, and a stationary cam having an inclined surface in the path of the belt adapted to successively engage the plungers.

11. A machine for peeling and coring apples or similar articles, including an endless carrier belt having runs in a substantially horizontal plane of which one run forms a feeding station and the other a discharge station, holders on said belt having forks to receive the individual articles at the feeding station, means adjacent to the path of travel of the belt for performing peeling and coring operations on the articles, and a device fixed in the path of travel of the belt at the discharge station for effecting the unloading of the articles from the said forks.

12. In an apparatus of the kind described, a continuously driven rotary head, holders spaced peripherally therearound adapted to have apples individually impaled thereon and including revolving impaling elements, means for peeling the apples while they are rotating, said means comprising a stationary cam centrally of the rotary head having an endless cam groove with a single throw surface, and peeling units on the rotary head corresponding to said holders, each of said units including a knife at the periphery of the rotary head, a radial rod rigidly extending inwardly therefrom, an actuating device supporting the rod and adapted to turn it about an axis radially of the rotary head in an oscillatory manner to cause the knife to travel about an apple on the corresponding holder, resilient means urging the rod inwardly of said axis to bring the knife into cutting engagement with the apple, and a follower geared to said actuating device and engaged with the endless cam groove of said stationary cam.

13. A structure as set forth in claim 12 and in which there is provided a swingably supported arm arranged transversely of the rod having a slotted distal end engaged with the same, the arrangement being such that the rod in one movement of its oscillation is urged outwardly of said axis by the arm so as to throw the knife out of engagement with the apple.

14. In an apparatus of the kind described, a continuously driven rotary head, holders spaced peripherally therearound adapted to have apples individually impaled thereon and including revolving impaling elements, means for peeling the apples while they are rotating, said means comprising a stationary cam centrally of the rotary head with an endless cam surface having a single throw, and peeling units on the rotary head corresponding to said holders, each unit including a knife, an actuating device for causing the knife to travel around a side of an apple on the corresponding holder to peel the same and to swing back to its initial position at the end of the peeling operation, a radial shaft rotatably supported, a follower rigidly carried by the shaft and engaged with the cam surface of said cam, and a pair of arms pivotally united, one of the arms being carried by the shaft and the other being connected to the knife so as to urge it outwardly of the apple as it swings back to its initial position at the end of the peeling operation.

15. A machine of the class described, comprising an endless carrier chain, spaced holders on the chain adapted to have apples individually impaled thereon, means for driving the chain, a rotary head having peripheral teeth engaged with the chain, means for rotating the apples while the holders are travelling around the rotary head, and a series of peeling units spaced around the rotary head adapted to come into alignment with the holders, said units including peeling knives, devices operably mounting the knives on the rotary head provided with shafts disposed radially of the axis of the rotary head, followers carried by said shafts, and a stationary cylinder cam centrally of the rotary head having an endless cam surface engaged with said followers and provided with a throw part whereby the knives are seriately actuated.

16. A machine of the class described, comprising an endless carrier chain, spaced holders on the chain adapted to have apples individually impaled thereon, means for driving the chain, a rotary head having peripheral teeth engaged with the chain, means for rotating the apples while the holders are travelling around the rotary head, and a series of peeling units spaced around the rotary head adapted to come into alignment with the holders, each peeling unit including a knife, a cam-actuated device for lowering and swinging the knife about the apple to effect the peeling thereof and then to swing the knife upwardly in a return movement, a cam-actuated device adapted to come into operation when the apple is peeled to cause the knife to recede clear of the apple as it swings upwardly in said return movement, and a central cam mechanism having endless cam surfaces common to all of the peeling units for operation of said devices in the course of rotation of the rotary head.

17. A machine as set forth in claim 8, in which the endless cam surfaces of the cam mechanism are stationary and serve to oscillate followers which are carried around by means of the rotary head and reciprocated during each turn thereof.

JOHN F. LINDNER.

REFERENCES CITED

The following references are of record in the file of this patent:

UNITED STATES PATENTS

| Number | Name | Date |
| --- | --- | --- |
| 287,601 | Wilcox | Oct. 30, 1883 |
| 1,451,571 | Gay | Apr. 10, 1923 |
| 900,949 | Pinkerton | Oct. 13, 1908 |
| 1,650,694 | Coons | Nov. 29, 1927 |
| 2,097,170 | Wilson | Oct. 26, 1937 |